United States Patent [19]

Mitsuyasu et al.

[11] Patent Number: 4,849,312
[45] Date of Patent: Jul. 18, 1989

[54] HYDROGEN STORAGE ALLOY ELECTRODE AND METHOD FOR PREPARING THE SAME

[75] Inventors: Kiyoshi Mitsuyasu; Motoya Kanda; Kazuta Takeno; Kenichi Kochiwa, all of Yokohama, Japan

[73] Assignees: Kabushiki Kaisha Toshiba, Kawasaki; Toshiba Battery Co., Ltd., Tokyo, both of Japan

[21] Appl. No.: 171,815

[22] Filed: Mar. 22, 1988

[30] Foreign Application Priority Data

Mar. 25, 1987 [JP]  Japan .................................. 62-69225

[51] Int. Cl.$^4$ ........................ H01M 4/02; H01M 4/04
[52] U.S. Cl. .................................... 429/217; 29/623.5
[58] Field of Search ............ 429/212, 217; 29/623.5, 29/623.1; 419/64, 65, 68, 69, 61, 8; 252/182.1; 420/900

[56] References Cited

U.S. PATENT DOCUMENTS

4,636,445  1/1987  Yamano et al. ...................... 429/53

FOREIGN PATENT DOCUMENTS

58-46827  10/1983  Japan .
61-66366  4/1986  Japan .

*Primary Examiner*—Anthony Skapars
*Attorney, Agent, or Firm*—Foley & Lardner, Schwartz, Jeffery, Schwaab, Mack, Blumenthal & Evans

[57] ABSTRACT

Disclosed is a hydrogen storage alloy electrode prepared by integrating a mixture of a hydrogen storage alloy powder, an electrical conducting powder and a polymer binder with a current collector, characterized in that the polymer binder is composed of a polyacrylic acid salt and polytetrafluoroethylene as essential components, and that the hydrogen storage alloy powder is coated with polyacrylic acid salt, wherein the three-dimensional reticulate molecular chain of the polyacrylic acid salt itself is partially severed. Disclosed also is a method of preparing a hydrogen storage alloy electrode which comprises the steps of preparing a paste of a mixture containing hydrogen storage alloy powder, electrical conducting powder and a polymer binder, coating a current collector with the paste, drying it and pressure molding the current collector coated with the paste, the method being characterized in that at least a polyacrylic acid salt and polytetrafluoroethylene are used as the polymer binder, and after the paste is stirred at a high speed, the current collector is coated with the paste.

11 Claims, 2 Drawing Sheets

HYDROGEN STORAGE ALLOY ELECTRODE AND METHOD FOR PREPARING THE SAME

BACKGROUND OF THE INVENTION

This invention relates to a hydrogen storage alloy electrode used as a negative electrode of an alkaline secondary battery and a method for preparing the hydrogen storage alloy electrode, and more particularly it relates to a paste type hydrogen storage alloy electrode in which a great deal of hydrogen storage alloy is present per unit volume and which permits the preparation of a battery having great capacity, is inexpensive, and can be mass-produced, and a method for preparing the same.

Much attention is now widely paid to a hydrogen battery which mainly consists of various hydrogen storage alloys, and uses a hydrogen storage alloy electrode, as a negative electrode, since the above hydrogen battery has high energy density. In particular, the hydrogen storage alloys of $LaNi_5$ series, $CaNi_5$ series and the like are expected as base materials for the above electrode, since they have low hydrogen equilibrium pressure.

In this kind of hydrogen storage alloy electrode, charge and discharge reactions take place as follows: At the time of the charge, hydrogen generated due to the electrolysis of water on the surface of the electrode is stored in the hydrogen storage alloy, and inversely at the time of the discharge, the stored hydrogen is released from that alloy and is then reacted with a hydroxyl ion, whereby the charge/discharge reaction is achieved.

Thus, in order to increase the energy density of the battery, there have been suggested two methods. One method intends to increase the amount of stored hydrogen per unit weight of the hydrogen storage alloy in the electrode, and another method intends to increase the amount of the hydrogen storage alloy which can be contained in the unit volume of the electrode.

As a method for preparing this hydrogen storage alloy electrode, for example, there is known a method which comprises first mixing hydrogen storage alloy powder with electrical conducting powder such as carbon black and then sintering the resulting mixture to a porous material (Japanese Unexamined Patent Publication No. 46827/1983) or a method comprises rolling a mixture obtained by kneading hydrogen storage alloy powder, polytetrafluoroethylene (PTFE) and viscosity increasing agent, followed by contact bonding to a current collector (see Japanese Unexamined Patent Publication No. 66366/1986).

In addition, the following other methods are also known:

(i) A method comprising the steps of kneading hydrogen storage alloy powder with Teflon grains, forming the mixture into a sheet, and pressing the sheet against a net-like current collector; (ii) a method comprising the step of packing a three-dimensional electrode core with a hydrogen storage alloy in the state of powder or a paste of the powder; (iii) a method comprising the steps of mixing a binder with hydrogen storage alloy powder and then pressing the mixture into pellets; (iv) a method comprising the step of rolling a hydrogen storage alloy; and (v) a method comprising the steps of kneading hydrogen storage alloy powder with a polymer binder such as polytetrafluoroethylene (PTFE), polyvinyl alcohol (PVA) or carboxymethyl cellulose (CMC) and an electrical conducting material to form a paste, coating a net-like current collector such as a punched metal with the paste, drying it, and then subjecting the entire current collector to a pressure molding treatment by use of a roller press. The pressure molding treatment in the last method (v) contemplates increasing the amount of the hydrogen storage alloy included in the unit volume of the prepared electrode.

However, each of the above methods for preparing the electrode has some drawbacks. That is, in the method (i), it is difficult to continuously prepare the electrodes. In the method (ii), the three-dimensional core which is a current collector is very expensive, and thus the industrial value of the electrode containing such a core is low. In the method (iii), it is difficult to make a large-scale electrode, enough to make a wound from electrode used in a cylindrical secondary battery. In the method (iv) of rolling of alloy, its use application is limited by a selected kind of alloy, and this method cannot be applied to hard and brittle alloys such as La series hydrogen storage alloys. Moreover, in preparing the hydrgen storage alloy electrode in accordance with the method (v) (a paste system), the following problem is posed:

That is, when a current collector net is coated with such a paste as mentioned above and is then dried, if the selected binder is CMC, the coated paste is solidified after the drying and is then easily peeled down from the current collector net in the subsequent pressure molding process. In such a state, the amount of the hydrogen storage alloy contained in the unit volume of the electrode is not so much as expected.

For the purpose of solving this problem, there have been suggested methods of using, as the current collectors, various kinds of foamed metals having a three-dimensional structure and sintered metallic fibers, but these current collectors all are very expensive, and so their industrial value is low.

SUMMARY OF THE INVENTION

An object of this invention is to provide a hydrogen storage alloy electrode prepared by means of pasting, having a large amount of the hydrogen storage alloy to be contained in the unit volume of the electrode, which can facilitate mass production at a low cost and the method of preparing the same.

The present inventors have intensively conducted researches with the intention of achieving the above-mentioned object, and as a result, they have found the fact that when a polyacrylic acid salt and PTFE are used as binders, a paste including these binders is not peeled down from a current collector coated therewith after drying, even if pressure molding is performed.

Furthermore, when the paste which has been previously stirred at a high speed is used, the surface of the hydrogen storage alloy grains is covered with the polyacrylic acid salt, whereby the oxidation of the alloy grains is prevented. That is, in the case that the alloy surfaces is not covered with the polyacrylic acid salt, three-phase interfaces of the alloy, water and air come out during the drying of the paste, and on these three-phase interfaces, a local battery reaction represented by the following formula occurs, so that the hydrogen storage alloy is rapidly oxidized, with the result that the hydrogen storage ability of the alloy is finally lost:

$$M + 2nOH^- \longrightarrow MO_n + n H_2O + 2n e$$

$$2H_2O + O_2 + 4_3 \longrightarrow 4OH^-$$

However, the present inventors have also found the following fact: Among the possible contacts between the alloy, water and air which occurs during the drying of the paste, the contact between the alloy and air can be prevented in case that the alloy surface is covered with the polyacrylic acid salt film. So that the alloy is scarcely oxidized.

On the basis of the above facts, the present inventors have developed the hydrogen storage alloy electrode and the method of preparing the same of this invention.

That is, according to this invention, there are provided a hydrogen storage alloy electrode prepared by integrally joining a mixture of hydrogen storage alloy powder, electrical conducting powder and a polymer binder to a current collector, the aforesaid hydrogen storage alloy electrode being characterized in that the polymer binder is composed of a polyacrylic acid salt and polytetrafluoroethylene as essential components; and a method for preparing a hydrogen storage alloy electrode which comprises the steps of preparing a paste of a mixture containing hydrogen storage alloy powder, electrical conducting powder and a polymer binder, coating a current collector with the paste, drying it, and pressure molding the current collector with the paste, the aforesaid method being characterized in that at least a polyacrylic acid salt and polytetrafluoroethylene are used as the polymer binder, and after the paste is stirred at a high speed, the current collector is coated with the paste.

DESCRIPTION OF THE PREFERRED EMBODIMENTS

Figure 1:
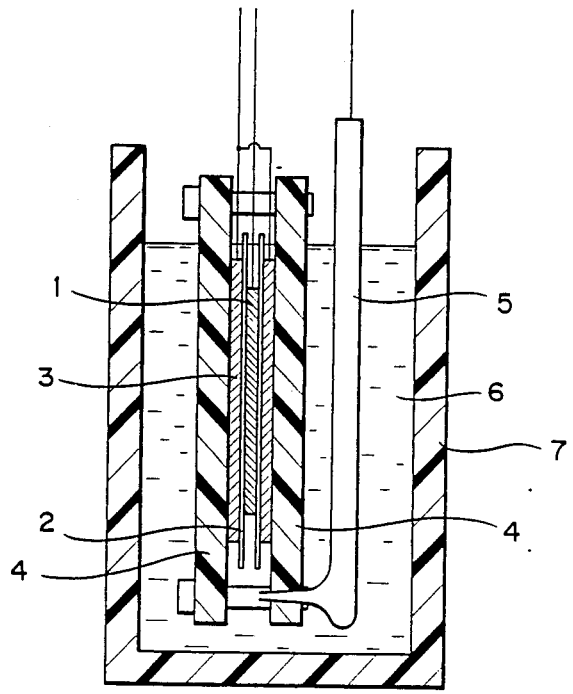
FIG. 1 is a schematic view of a test cell used to measure charge/discharge efficiency of a hydrogen storage alloy electrode.

In the preparation of the electrode of this invention, hydrogen storage alloy powder, electrical conducting powder, a polymer binder and water are first mixed to prepare a paste, and the latter is then stirred at a high speed.

Raw materials for the hydrogen storage alloy are not particularly limited, but they must have the function to store hydrogen electrochemically generated in an electrolyte and to easily release the stored hydrogen therefrom at the time of discharge. Examples of the alloy materials include $LaNi_5$; $MnNi_5$ (Mm: misch metal); $LmNi_5$ (Lm: misch metal rich in lanthanum); multi-element series alloys in which Ni atoms of the above compounds are partially replaced with other metals such as Al, Mn, Fe, Co, Ti, Cu, Zn, Zr and Cr; $Mg_2Ni$ series alloys; TiNi series alloys; and TiFe series alloys.

These alloys, when used, may be usually ground into powder having an average powder diameter of about 10 to about 30 $\mu$m.

Examples of the above-mentioned electrical conducting powder materials include carbon black and graphite powder.

The paste regarding this invention is characterized by containing, as the essential components, the polyacrylic acid salt and PTFE which are the polymer binders, and by being stirred at a high speed. In this case, functions of the respective components are not clearly elucidated, but in terms of phenominalism, the polyacrylic acid salt is effective to bind the hydrogen storage alloy powder together during the drying of the coated paste, and PTFE becomes fibrous by itself at the time of pressure molding and effectively retains the hydrogen storage alloy powder.

Here, important things are as follows: PTFE becomes fibrous by a roller press, and thus the hydrogen storage alloy must be retained on this fibrous PTFE by another binder. The polyacrylic acid salt is considered to adhesively contribute to the above retention of the fibrous PTFE. The reason why the surfaces of the hydrogen storage alloy powder is covered with the polyacrylic acid salt by stirring the paste at a high speed would be that molecular chains of the polyacrylic acid salt are severed due to the high-speed stirring operation to increase the flowability of the paste. That is, it can be presumed that the above-mentioned two components exert their specific effects in the respective unit steps of the preparation of the electrode, so that the hydrogen storage alloy powder is prevented from peeling down and the amount of the hydrogen storage alloy in the paste is increased.

Examples of the polyacrylic acid salts include sodium polyacrylate and ammonium polyacrylate, and an example of PTFE is dispersion type PTFE.

In the paste regarding this invention, the amount of the polyacrylic acid salt is preferably in the range of 0.1 to 0.8 parts by weight with respect to 100 parts by weight of the hydrogen storage alloy powder. When the amount of the polyacrylic acid salt is less than 0.1 parts by weight, the above-mentioned effect cannot be exerted sufficiently, and it is impossible to uniformly coat the current collector with the paste. Moreover, the effect of the polyacrylic acid salt reaches its upper limit at an amount of 0.8 parts by weight, and thus the addition of the polyacrylic acid salt in excess of this amount is useless and doesn't improve the spreadability. In addition, the excessive amount of the polyacrylic acid salt disturbs electrical conduction among the hydrogen storage alloy powder.

The amount of PTFE is preferably in the range of 0.5 to 4 parts by weight in terms of solid. When the amount of PTFE is less than 0.5 parts by weight, the binding effect of PTFE is low in the pressure molding step, and when it is more than 4 parts by weight, conductive properties of the electode deteriorate all over, and PTFE aggromerates as it becomes fibrous during the high-speed stirring, so that the paste cannot be applied onto the current collector uniformly.

The amount of the electrical conducting material is usually in the range of 0.1 to 5 parts by weight.

The paste may be prepared by mixing predetermined amounts of the above respective components and then stirring the mixture at a high speed. At this time, CMC and PVA which have been heretofore used as binders may be added thereto in suitable amounts. Moreover, water may be added thereto so as to adjust the viscosity of the paste.

In stirring the paste at a high speed, for example, while an electromotive stirring machine may be used. Revolutions and the like of the stirring machine may be varied depending on the conditions employed so long as it is operated at a sufficient speed to achieve severing of the three-dimensional reticulate structure of the polyacrylic acid salt. It should be noted that the polyacrylic acid salt assumes a sol state by carrying out this high-speed stirring.

With the thus prepared paste, the current collector is coated in a predetermined thickness, and the paste is dried at a temperature of about 80° C., followed by pressure molding by use of a roller press, thereby obtaining the hydrogen storage alloy electrode of this invention.

The density of the hydrogen storage alloy in the electrode obtained may be 4.0 g/cm$^3$ or higher, preferably between 4.5 and 6.0 g/cm$^3$. The reason for the above is that a density of at least 4.0 g/cm$^3$ is required in order to secure electric connection of the hydrogen storage alloy powder itself.

If the density is less than 4.0 g/cm$^3$, electric connection of the hydrogen storage powder itself may not be obtained; whereas if the density is more than 6.0 g/cm$^3$, retention of the electrolytic solution will be difficult.

Examples 1 to 5

Prepared was 100 g of hydrogen storage alloy powder having a composition of LaNi$_{4.7}$Al$_{0.3}$ and an average powder diameter of 20 μm, and to this alloy, sodium polyacrylate and PVA or CMC were added in ratios of Examples 1 to 5 in Table 1. In addition, carbon was added thereto as an electrical conducting material, and water and a PTFE dispersion were further added thereto, followed by high-speed stirring, thereby obtaining pastes.

Each punched metal current collector was coated with the thus obtained paste, and after drying by warm air at 80° C., and was subjected to a roller press operation. The press operation was carried out until the current collector was stretched 20% in the length and the amount of the hydrogen storage alloy reached about 4.5 g/cm$^3$.

Strengths of the electrodes thus prepared are set forth together with compositions of binders in Table 1.

Comparative Examples 1 to 10

For comparison, the same procedure as in Examples 1 to 5 was repeated in order to prepare hydrogen storage alloy electrodes having compositions set forth in Table 1.

Strengths of the electrodes thus prepared are set forth together with compositions of binders in Table 1.

TABLE 1

| | Composition of Binder | | | | |
|---|---|---|---|---|---|
| | Sodium Poly-acrylate | PTFE Dispersion | CMC | PVA | Strength of Electrode |
| Example 1 | 0.5 g | 1.65 ml | — | — | Good |
| Example 2 | 0.1 g | 1.65 ml | — | — | Good |
| Example 3 | 0.5 g | 1.65 ml | 0.5 g | — | Good |
| Example 4 | 0.5 g | 1.65 ml | — | 0.5 g | Good |
| Example 5 | 0.5 g | 1.65 ml | 0.25 g | 0.25 g | Good |
| Comparative Example 1 | 0.05 g | 1.65 ml | — | — | Coating was impossible |
| Comparative Example 2 | 0.05 g | 1.65 ml | 0.5 g | — | Paste was peeled down |
| Comparative Example 3 | 0.5 g | — | — | — | Paste was peeled down |
| Comparative Example 4 | — | 1.65 ml | — | — | Coating was impossible |
| Comparative Example 5 | — | — | 0.5 g | — | Paste was peeled down |
| Comparative Example 6 | — | — | 1.0 g | — | Paste was peeled down |
| Comparative Example 7 | — | — | 1.0 g | 1.0 g | Paste was peeled down |
| Comparative Example 8 | — | — | — | 1.2 g | Paste was peeled down |
| Comparative Example 9 | — | 1.65 ml | 0.2 g | — | Paste was peeled down |
| Comparative Example 10 | — | 1.65 ml | — | 0.2 g | Paste was peeled down |

Each figure above denotes an amount with respect to 100 g of the alloy.
The PTFE dispersion contained 0.9 g of PTFE solid in 1 ml thereof.

As shown in Table 1, the electrodes having good strengths are not obtained when contents of sodium polyacrylate and PTFE are not contained proper amount. Moreover, as is apparent from the results in Table 1, even when other binders are added, similar effects can be obtained, if sodium polyacrylate and PTFE are present.

Next, the electrode (electrode A) of Example 1 and an electrode (electrode B) made without the high-speed stirring from a material in which the composition of the binder was the same as in Example 1 were each used to build up a test cell shown in FIG. 1, and tests were carried out to inspect charge/discharge efficiencies of hydrogen storage alloy electrodes.

In FIG. 1, reference numeral 1 is a hydrogen storage alloy electrode, and this electrode 1, as well as the Ni electrodes 3, 3 disposed on both sides of said electrode 1 through separators 2, 2 comprising a polypropylene unwoven fabric, is supported between acrylic resin holding plates 4, 4. Numeral 5 is a reference electrode which consists of a mercury oxide electrode and is housed in an acylic resin battery vessel 71 which is filled with an electrolyte 6 comprising a 8N KOH aqueous solution, and the above-mentioned hydrogen storage alloy electrode 1 is also received in the vessel 7. In this case, the Ni electrode 3 is added in an excessive amount to the hydrogen storage alloy electrode.

Figure 2:
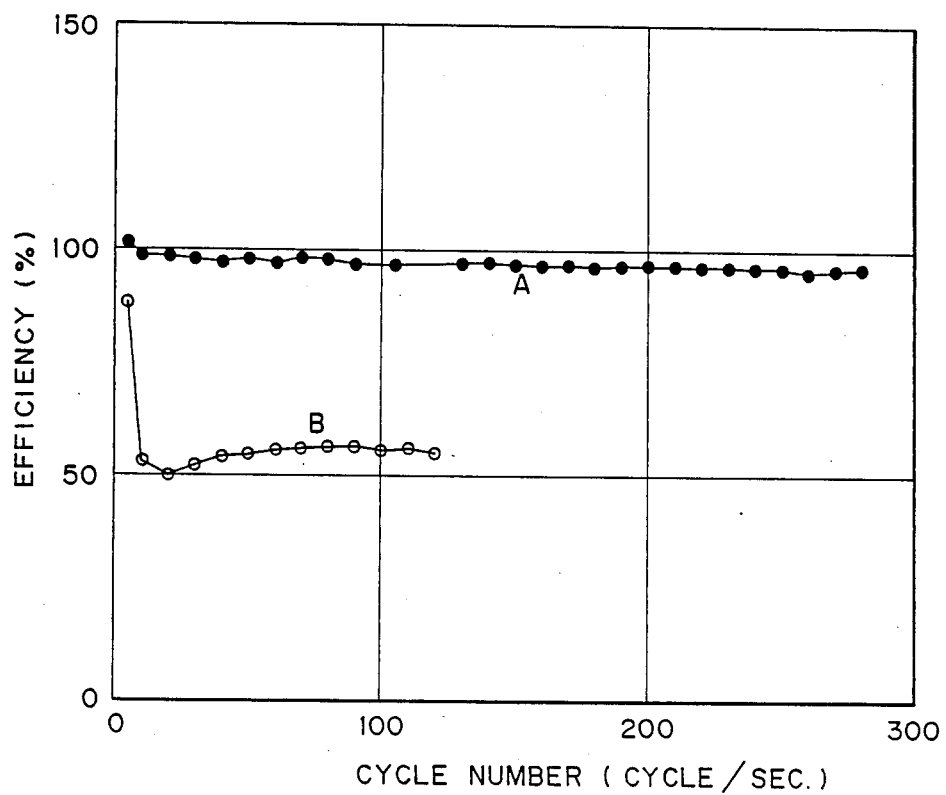
FIG. 2 is an explanatory view illustrating a relation of cycle number and charge/discharge efficiency between an electrode of this invention and an electrode for comparison.

In the test conditions, charge was carried out at a current of 170 mA for 1 hour with respect to 1 g of the hdyrogen storage alloy contained in the electrode, and discharge was carried out at the similar current until the potential of the hydrogen storage alloy electrode reached a level of −0.7 V to a mercury oxide electrode. Under these test conditions, the cycle of the charge/discharge was repeated. The results are shown in FIG. 2.

As is apparent from this drawing, the efficiency of the electrode B made without the high-speed stirring is as low as 60% or so, whereas that of the electrode A made performing the high-speed stirring is very excellent and is about 95% or more even after 200 cycles.

As is apparent from the above description, the electrode of this invention can have high strength, even when the amount of the hydrogen storage alloy per unit volume of the electrode is increased to 4.0 g/cm3 or more. Moreover, in the electrode of this invention, a dried paste is not peeled down from a current collector, and charge/discharge efficiency is also high. In consequence, the electrode of this invention is useful as an electrode for a high energy density battery and is thus considered to have a great industrial value.

What is claimed is:

1. A hydrogen storage alloy electrode prepared by integrating a mixture of a hydrogen storage alloy powder, an electrical conducting powder and a polymer binder with a current collector, characterized in that said polymer binder is composed of a polyacrylic acid salt and polytetrafluoroethylene as essential components, and that said hydrogen storage alloy powder is coated with polyacrylic acid salt, wherein the three-dimensional reticulate molecular chain of the polyacrylic acid salt itself is partially severed.

2. A hydrogen storage alloy electrode according to claim 1, wherein the hydrogen storage alloy powder is coated with a colloidal polyacrylic acid salt.

3. A hydrogen storage alloy electrode according to claim 1, wherein the hydrogen storage alloy in the electrode has a density of 4.0 g/cm$^3$ or more.

4. A hydrogen storage alloy electrode according to claim 1, wherein the hydrogen storage alloy in the electrode has a density of 4.5 to 6.0 g/cm$^3$ or more.

5. A hydrogen storage alloy electrode according to claim 1, wherein the amount of the polyacrylic acid salt is in the range of 0.1 to 0.8 parts by weight relative to 100 parts by weight of the hydrogen storage alloy powder.

6. A hydrogen storage alloy electrode according to claim 1, wherein the amount of the polytetrafluoroethylene is in the range of 0.5 to 4 parts by weight relative to 100 parts by weigeht of the hydrogen storage alloy powder.

7. A method of preparing a hydrogen storage alloy electrode which comprises the steps of preparing a paste of a mixture containing hydrogen storage alloy powder, electrical conducting powder and a polymer binder, coating a current collector with said paste, drying it and pressure molding said current collector coated with said paste, said method being characterized in that at least a polyacrylic acid salt and polytetrafluoroethylene are used as said polymer binder, and after said paste is stirred at a high speed, said current collector is coated with said paste.

8. A method of preparing a hydrogen storage alloy electrode according to claim 7, wherein the three-dimensional reticulate molecular chain of the polyacrylic acid salt is partially severed by means of high-speed stirring.

9. A method of preparing a hydrogen storage alloy electrode according to claim 7, wherein the polyacrylic acid salt is used in a collolidal form by means of high-speed stirring.

10. A method for preparing a hydrogen storage alloy electrode according to claim 7, wherein said pressure molding is carried out by a roller press operation.

11. A method for preparing a hydrogen storage alloy electrode according to claim 7, wherein the amount of the hydrogen storage alloy per unit volume of the electrode can be increased to 4.0 g/cm$^3$ or more.

* * * * *